United States Patent [19]
Lutz et al.

[11] 3,772,917
[45] Nov. 20, 1973

[54] FLUID FLOW METER

[75] Inventors: **Paul D. Lutz,
William M. Booth,**
both of Grand Haven, Mich.

[73] Assignee: Carlon Meter Company, Inc.
Grand Haven, Mich.

[22] Filed: June 21, 1971

[21] Appl. No.: 154,947

[52] U.S. Cl..................... 73/231 R, 73/258, 74/435
[51] Int. Cl............................................... G01f 3/12
[58] Field of Search ................. 73/258, 231; 74/435

[56] References Cited
UNITED STATES PATENTS
3,564,919  2/1971  Varga ................................... 73/258

Primary Examiner—Richard C. Queisser
Assistant Examiner—Arthur E. Korkosz
Attorney—Price, Heneveld, Huizenga & Cooper

[57] ABSTRACT

In a remote read-out fluid meter, a novel impulse generator is provided. The impulse generator is removably mounted to the meter casing and includes a magnet mounted on a rotating gear which is reciprocated once for each revolution of the drive gear of a meter measuring mechanism. The reciprocal movement of the magnet is detected by a stationary armature which for each reciprocation of the magnet generates an electrical impulse which operates a remotely positioned counter. The generator includes a mounting bracket which permits quick and easy insertion or removal from the meter casing.

19 Claims, 4 Drawing Figures

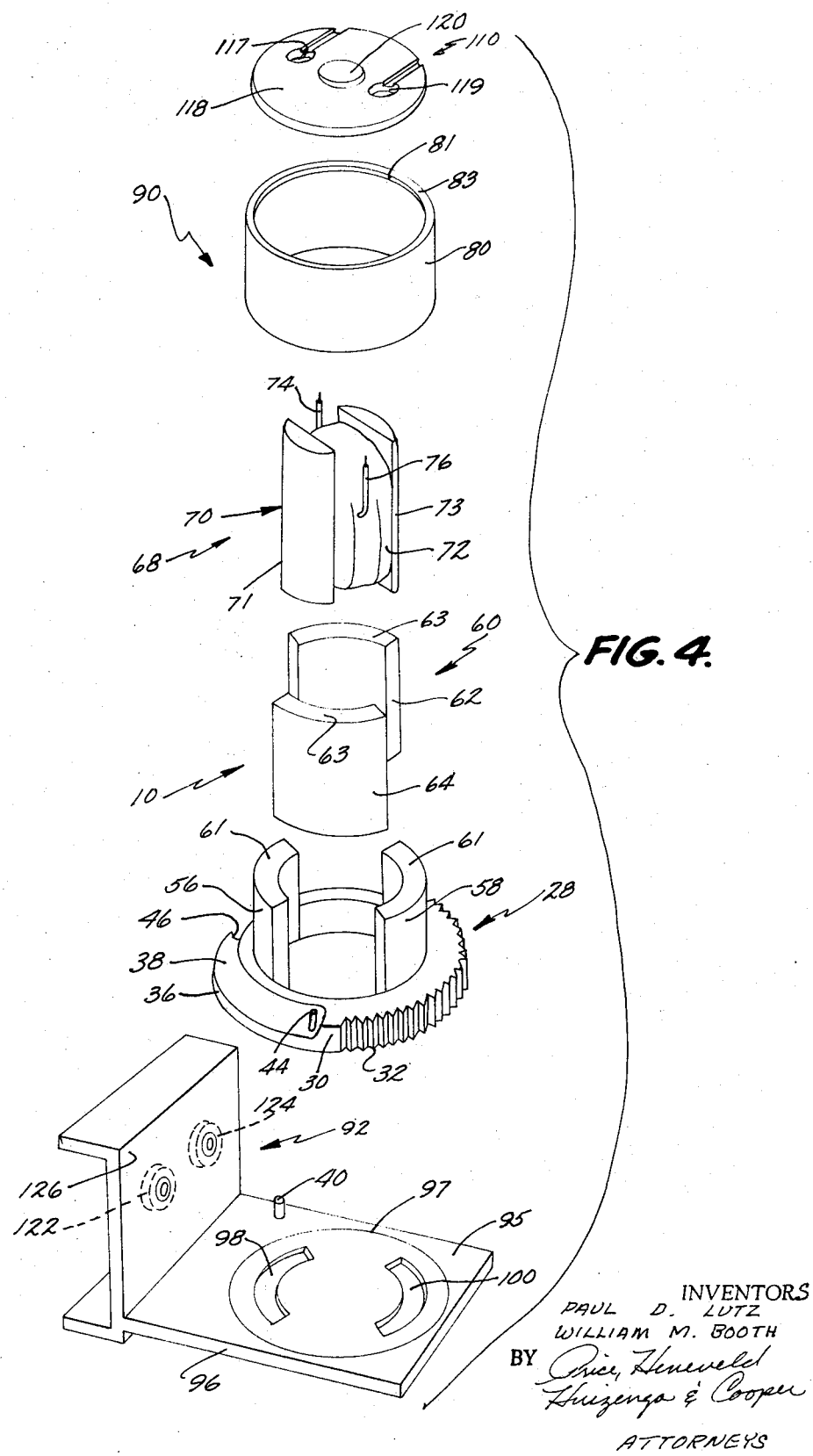

FLUID FLOW METER

BACKGROUND OF THE INVENTION

In conventional water flow meters, the register forms a part of the measuring mechanism making it inconvenient to read since the mechanism is generally located in the basement of a home or building. Present proposals provide a remote counting mechanism which is electrically interconnected to the flow meter, but mounted in a more convenient location such as on the exterior of a building. The impulse generators suggested by these proposals however have been inadequate for several reasons. One drawback is the provision of a rotating armature. This causes continual movement and bending of the lead wires and thereby shortens the service life of the unit. Another drawback is the permanency with which the generator is mounted to the flow meter. This means that if there is a malfunction, no matter how simple, the entire measuring mechanism as well as the impulse generator must be removed and/or replaced. Further, another problem in remote read-out units resides in the present requirement that the remote read-out units constitute substantially different components than the direct read-out devices, therefore requiring the manufacturer to make and stock large numbers of different components for the two different type of units. Thus, there is a present need for an improved remote read-out meter which can utilize the present direct read-out components and in which the impulse generator can be simply and quickly removed from the flow meter casing as a unit to permit maintenance and/or replacement thereof. There is also a need for a less complex, less expensive generator.

SUMMARY OF INVENTION

This invention relates to a device for actuating a visible counter located remotely from a fluid flow meter measuring mechanism and, more particularly, to a device which converts the kinetic energy of a rotating spindle into pulses of electrical energy for operation of water meter counters. To fulfill the present needs, this invention proposes a fluid flow meter and casing which includes a rotating spur gear driven by a spindle which rotates in response to defined volumes or rates of fluid flow. An impulse generator is mounted to a mounting bracket and cover and includes a spring biased reciprocating spur gear intermittently driven by said rotating gear in a direction opposite the direction of bias. After each phase of driving engagement, the energy converted by the rotating spindle into the spring causes rapid counter revolution of the reciprocating gear. A magnet is mounted to the reciprocating gear for rotation therewith adjacent a detection means which detects the rotating magnetic field and converts the rotating field into an electrical impulse. The electrical impulse generated is transmitted through appropriate lead wires to an externally positioned counter for actuation of same. The impulse generator and mounting bracket are slidable within an opening in the meter casing for proper indexing of said reciprocating gear with said rotating spur gear. The mounting bracket includes means for hermetically sealing the bracket within said openings. A preferred detection means includes an armature mounted within a cylindrically shaped magnet so that when the spring biased reciprocating spur gear is released from engagement with said rotating spur gear, the rapid rotation of said reciprocating gear induces a current through said armature which is transmitted through the lead wires to said external counter.

One advantage of the proposed invention is the improved simplicity of the impulse generator which greatly increases the service life of the generator. Another important advantage is the arrangement of the generator and mounting bracket as a single unit which can be inserted and removed as a unit from the flow meter without requiring an adjustment or alteration of any other part of the flow meter. This provides extreme economy in both parts and labor since a malfunctioning of the generator does not require removal or replacement of the entire flow meter assembly. Also, the time required to ascertain the problem is greatly diminished since the generator can be removed and inspected as a unit simply by removing the mounting screws.

In addition, the generator proposed by this invention in one form is positioned side-by-side in relation to the measuring mechanism so that the generator may be easily mounted to existing meters already in use. While the upper casing may require re-placement with one including the generator housing, the side-by-side relationship permits easy reading of the main registering at the meter situs if desired. Various other advantages will become apparent in light of the following description of the preferred embodiment and attached drawings.

DESCRIPTION OF THE DRAWINGS

FIG. 4 is an exploded view of the impulse generator assembly.

DESCRIPTION OF THE PREFERRED EMBODIMENT

Figure 1:
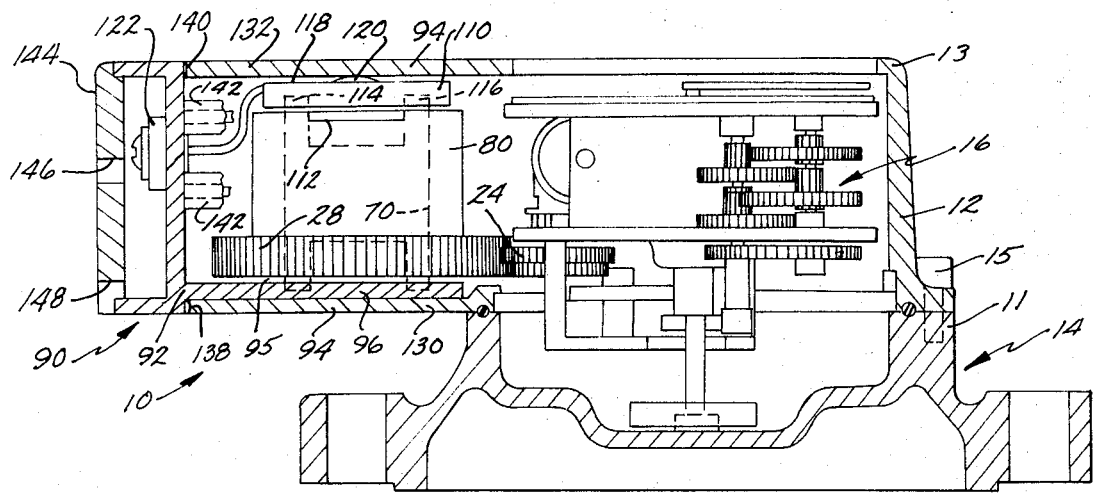
FIG. 1 is an elevation view in cross section of the upper portion of a fluid flow meter embodying the novel impulse generator provided by this invention.

While the impulse generator provided by this invention is adaptable to a variety of applications, it will be described and illustrated in detail in connection with a water flow meter commonly found in the basement of a home which is supplied with water by a public utility system. In such systems, the meter register is usually included in the measuring mechanism and hence is not positioned in a very convenient place for periodic water readings. To eliminate this inconvenience, this invention proposes a novel impulse generator mechanism 10 which converts the kinetic energy of a rotating spindle operated by the flow meter into pulses of electrical energy which are transmitted to a register positioned remotely from the flow meter. The most convenient position for such a remotely positioned register is on the exterior of the building to permit free access for the meter reader without necessitating entry into the building. In addition, the impulse generator provided by this invention requires no external or auxiliary source of power for operation other than that derived from the flow meter itself.

Also, an important aspect of the invention provides a flow meter with a housing 12 having two side-by-side enclosures 13 and 94 enclosing the primary measuring mechanism 16 and the impulse generator 10. This permits easy reading of the main registry at the meter situs if desired.

Referring now to the drawings in detail, FIG. 1 shows the upper casing 11 of a flow meter 14 which includes a housing 12 having side-by-side enclosures 13 and 94 enclosing the volume or flow rate measuring mechanism 16 and impulse generator 10. The housing 12 is anchored to the upper casing 11 by a plurality of set screws 15. The specific details of the fluid flow meter and measuring mechanism are well known to those skilled in this art and hence not explained in detail. It is sufficient to appreciate that through the operation of the various gears and spur gears incorporated in the measuring mechanism, a sweep hand 18 is rotated at a rate responsive to whatever the volume of flow is through the meter. A graduated indexing face 20 positioned below the sweep hand indicates the number of units such as gallons is flowing through the meter. Each revolution of the sweep hand advances a digital register 22 which provides a visual record of the volume flow over a period of time.

A spur gear 24 is mounted on a rotating spindle 26 which is interconnected to the measuring mechanism 16 so that the spur gear 24 will make one complete revolution in response to a selected volume of flow through the meter which will advance register 22 one unit. While the calibration is arbitrary, the rate of revolution is generally defined in terms of 100, 500, or 1,000 gallons of water flow through the meter. Only a portion 48 of spur gear 24 includes gear teeth so that its drive characteristic is intermittent with respect to each revolution.

The impulse generator 10 includes a reciprocating spur gear 28 operatively engagable by rotating spur gear 24 during a portion of each revolution of gear 24. During the remainder of each revolution, gear 28 is outside the influence of gear 24. Reciprocating spur gear 28 includes a generally washer-shaped portion 30. The circumferencial periphery of the washer-shaped portion is comprised of three distinct portions 32, 34 and 36. Portion 32 is comprised of gear engaging teeth 33 for engagement with portion 48 of rotating spur gear 24. A second portion 34 is recessed with respect to the projection of teeth 32 so that it is free of spur gear 24 and the third portion 36 which projects radially equal to the gear teeth 32 includes a spring receiving or mounting trackway 38.

Figure 3:
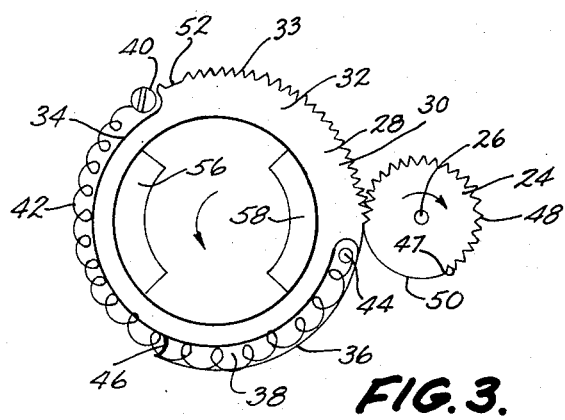
FIG. 3 is a plan view of the reciprocating and drive gears at the termination of the drive phase.

The significance of these portions is as follows. Reciprocating spur gear 28 is spring biased in a direction opposite that in which the spur gear is driven by rotating gear 24. This can be accomplished in various ways, however, one configuration is to provide a post 40 mounted adjacent spur gear 28 within recessed portion 34 to which is anchored a coil spring 42 whose opposite end is anchored to a post 44 mounted on spur gear 28 in the trackway 38. The trackway 38 at its opposite end from post 44 terminates in a stop face 46 which is initially in close proximity to post 40. As the reciprocating spur gear is driven by rotating gear 24, the stop surface 46 along with the entire reciprocating gear is rotated counterclockwise until the tooth portion 48 of gear 24 and tooth portion 32 of gear 28 reach a position wherein they will become disengaged as shown in FIG. 3. In this position, the spring bias is a maximum. Upon disengagement of the two gears, the spring will snap the reciprocating gear 28 in a clockwise direction very rapidly until stop surface 46 abuts against post 40. This impulsive movement of reciprocating gear 28 provides the necessary motion for operating the impulse generator which will be described in more detail hereinafter. After this impulsive movement, rotating gear 24 continues to rotate in response to flow through the meter with the non-engaging portion 50 rotating past the outer periphery of spur gear 28. At the termination of this non-engaging portion, teeth 48 on gear 24 will once more engage teeth 32 on gear 28 and begin reciprocal drive of gear 28 in a counterclockwise direction.

Figure 2:
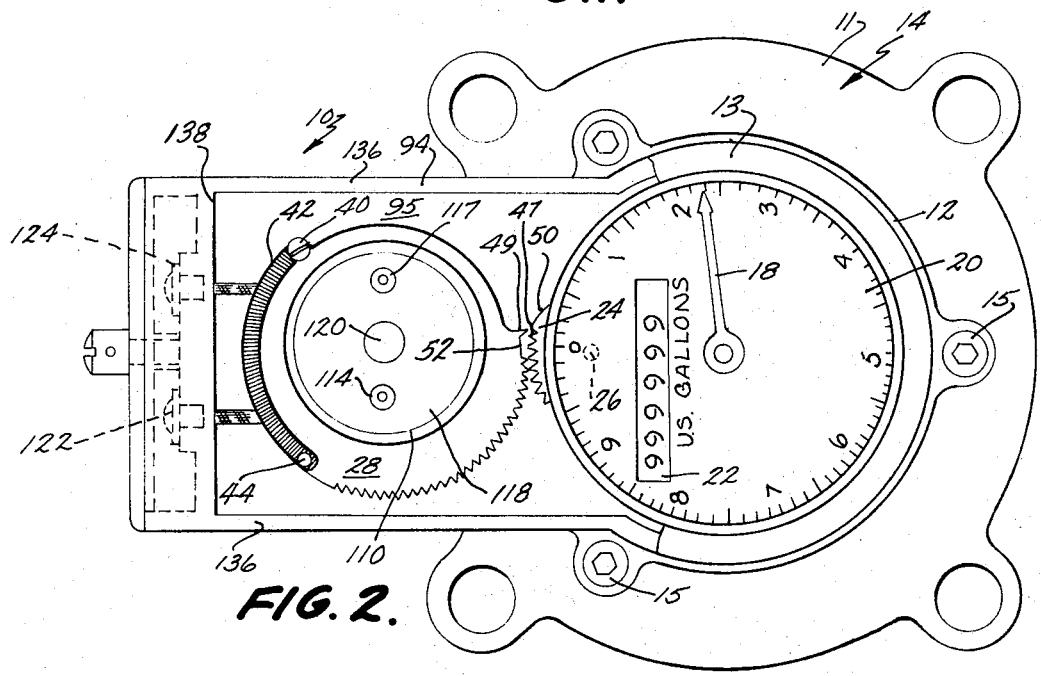
FIG. 2 is a top view of the flow meter with the top portion of the casing eliminated showing the reciprocating spur gear at the beginning of drive engagement.

With reference to FIGS. 2 and 3, a gapped portion 52 is provided at the inception of teeth 33 on the reciprocating spur gear to guarantee a smooth non-binding start of engagement between the two rotating gears. The deletion of teeth in the gapped portion permits the introduction of teeth 48 into a meshed relationship with teeth 33. Once the lead tooth 47 on rotating gear 24 is in driving abutment with the lead tooth 49 on reciprocating gear 28, the spacing is defined and accurate mesh engagement is provided between the remaining teeth on each gear.

Referring now to FIG. 4, the preferred arrangement of the generator 10 is shown. In addition to the washer portion 30 of reciprocating gear 28, a pair of longitudinally extending cylindrical segment portions 56 and 58 are provided integral with the washer portion. These segments locate and index a two pole magnet 60 wherein each pole is comprised of a cylindrical segment 62 and 64 which correspond in overall dimensions to segments 56 and 58 of the reciprocating gear to form a lock fit therebetween. In this fashion, the impulsive movement of reciprocating gear 28 likewise moves magnet 60 impulsively to produce a rotating magnetic field. It is the detection of this magnetic field and conversion to an electrical output signal which operates the remotely placed register (not shown). It will be appreciated that magnet 60 could be a one piece cylinder and multi-poled. The preferred form however reduces the amount of magnetic material required and hence is more economical.

A preferred detection means 68 includes a pole piece 70 and winding 72. The pole piece is comprised of a ferromagnetic material and along with winding 72 forms a conventional armature which detects and converts the rotating magnetic field to an impulse voltage across the opposite ends of the armature winding which terminates in two lead wires 74 and 76. By interconnecting the remote register with the lead wires through appropriate circuitry, the remote register is appropriately indexed during each impulsive rotation of reciprocation gear 28. A cylindrical shield 80 is provided over the armature and magnet pieces 62 and 64 in order to confine and concentrate the rotating magnetic field to produce a strong impulse to drive the remote register. It will be appreciated that various modifications could be employed to achieve the same result. However, one advantage of the preferred embodiment is that the pole pieces and winding remain stationary with the magnet rotating thereabout. Since the lead wires come from the pole piece or armature, they are likewise stationary and therefore the service life of the generator itself is greatly increased.

Additional advantages are provided by this invention according to the unique way that the impulse generator is arranged to provide a capsule 90 which can be quickly and simply inserted or removed from the meter housing 12 as a single unit in order to provide quick and simple maintenence or replacement of the capsule. In this regard, a generally L-shaped mounting bracket 92 is provided for mounting the generator thereon, the bracket and generator being insertable into a radially extending enclosure portion 94 integral with the enclosure portion 13 of meter housing 12. The horizontal leg 96 (FIGS. 1 and 4) includes a pair of recessed portions 98 and 100 which index and anchor pole piece 70 relative to spur gear 28 and magnets mounted thereon.

Referring briefly to FIG. 4, pole piece 70 is shown to be an integral member having an overall H-shaped configuration, each leg of the H having an overall cylindrical configuration. The longitudinal length of the pole piece exceeds that of the magnet and shield so that when it is positioned centrally therein, the legs 71 and 73 project beyond the ends of the magnet and shield. In this fashion, the lower portions are insertable into recessed portions 98 and 100 to anchor the pole piece into place on mounting bracket 92. With pole piece 70 and armature 72 in position, the reciprocating spur gear 28 is inserted over the pole piece and the magnets 62 and 64 are indexed into position between the longitudinally extending projections 56 and 58 of the spur gear. The magnetic attraction between the pole piece 70 and magnetic pieces 62 and 64 will hold the generator generally in place. The reciprocating spur gear 28 is comprised of a suitable friction free material such as plastic so that the engagement between the upper surface 95 of leg 96 of bracket 92 and the bottom surface of washer portion 30 of gear 28 does not pose a problem in terms of resisting the rotation of the spur gear. A relatively smooth upper surface 95 on the mounting bracket of course is desired. As shown in FIG. 4, a bearing 97 of suitable material may be provided to facilitate relative movement between the spur gear and bracket. With pole pieces 70, spur gear 28 and magnets 62 and 64 in position, shield 80 can be installed.

Preferably, a radial flange 81 extends inwardly from the upper edge 83 of shield 80, flange 81 coming into abutment with the upper surfaces 61 and 63 of projection 56, 58 and magnets 62 and 64 to properly position the shield. A non-magnetic cap 110 comprised of a material similar to spur gear 28 fits over the upper end of the pole piece legs 71 and 73 to complete the formation of generator 10. Cap 110 (FIG. 1) includes a central depending portion 112 which fits snugly between the upper extending projections of the pole piece legs 71 and 73 and includes a pair of recessed portions 114 and 116 corresponding to portions 98 and 100 on mounting bracket 92 to encapsulate the upper ends of the pole legs. The upper surface 118 of cap 110 is generally flat except for a dome shaped portion 120 which extends above surface 118 to form a friction keeper for locking the generator capsule in the motor casing in a fashion explained hereinafter. Preferably, a pair of openings 117 and 119 are provided in cap 110 for lead wires 74 and 76. The lead wires are preferably connected to a pair of terminals 122 and 124 mounted in the vertical leg 126 of mounting bracket 92. The terminals extend through leg 126 of the bracket for connection to electrical circuitry which leads to the remote register.

Turning now to the meter and generator housing arrangement shown in FIGS. 1 and 2, enclosure portion 94 is shown to have a generally rectangular cross section including a bottom 130, top 132 and sides 134 and 136 with an open end 138. With the impulse generator mounted on the horizontal leg 96 of the mounting bracket, and with the lead wires appropriately attached to terminals 122 and 124, the entire generator and mounting bracket are inserted in opening 138 of generator enclosure 94. The generator is positioned on the mounting bracket so that when the vertical leg 92 of bracket 90 abuts against end 138 of enclosure 94, reciprocating spur gear 28 is properly positioned for mesh engagement with rotating spur gear 24. Also, the spacing between the bottom 130 and top 132 of the enclosure is such that the friction keeper 120 provides a a friction tight engagement with top 132 so that the entire impulse generator arrangement is held positively in position by the pressure generated on cap 110.

Preferably, a gasket 140 is positioned intermediate that portion of the mounting bracket which abuts against end 138 of enclosure 94 and with appropriate mounting screws 142, the bracket is secured to housing 12. The gasket 140 provides a hermetic seal between the mounting bracket and meter casing so that there can be no contamination of the metering mechanism and impulse generator while the meter is being used. If desired, a cover plate 144 covers terminals 122 and 124, the plate having appropriate apertures 146 and 148 permitting insertion of appropriate electrical circuitry to be connected to the remotely positioned register.

The generator and measuring mechanism, housing 12 defines both the measuring mechanism enclosure 13 and generator enclosure 94 in a side-by-side relationship. This permits the existing measuring mechanism 16; meter face 20 and digital register 22 to be read clearly at the meter situs if desired. Thus, the generator 10 and its enclosure 94 does not prevent one from taking a meter reading at the situs of the meter. An opening 150 is provided at the juncture of the generator enclosure 94 and measuring mechanism enclosure 13 to permit spur gears 24 and 28 to engage for operation of the generator. Preferably the entire housing 12 is an integral plastic casting which is anchored to upper casing 11 by set screws 15. Although the casing 11 is bronze, the plastic housing 12 reduces the overall cost of the meter and, it can easily be attached to existing meters although in some cases the upper casing 11 must also be replaced.

Thus, the entire generator and mounting bracket as a single unit can be simply and quickly inserted or removed from the housing 12 of the meter for repair or replacement. This greatly reduces the labor commensurate with working on the generator if there is indeed a malfunction without requiring the adjustment of any of the gearing of the meauring mechanism 16.

ASSEMBLY AND OPERATION

Briefly, the assembly and operation is as follows. With the impulse generator 10 assembled as described, the mounting bracket 90 is inserted through opening 138 into the generator enclosure 94 which is preferably integral with the upper housing 12 of casing 11. Spring 42 will bias the reciprocating gear into the position shown in IG. 2 wherein stop surface 46 abuts against post 40. With the mounting bracket and generator inserted in the housing, the flow meter is ready for operation. As fluid flow passes through the meter, rotating spur gear 24 begins rotating at a rate responsive to the flow rate. For a given volume of flow, for example 100 gallons, rotating spur gear 24 will make one complete revolution. During this revolution, toothed portion 48 of spur gear 24 will initiate mesh engagement with toothed portion 32 of spur gear 28 and cause reciprocal movement of the reciprocating spur gear in a counter-clockwise direction thus increasing the tension on spring 42. The circumferential lengths of toothed portions 32 and 48 are identical so that when the reduced smooth portion 50 of spur gear 24 approaches close proximity to spur gear 28, the smooth portion 36 of spur gear 28 likewise approaches. As soon as there is a break in mesh engagement between the two spur gears, spring 42 rapidly rotates spur gear 28 in a clockwise direction causing the two pole magnets 60 to create a moving magnetic field. The stationary pole pieces 70 and armature winding 72 detects this magnetic field and converts it into an electrical impulse signal which is transmitted via lead wires 74 and 76. This signal is conducted to a remotely positioned register (not shown) and is intense enough to actuate the register which is calibrated in denominations of 100 gallons. Thus, the kinetic energy of the rotating spindle 26 or spur gear 24 is converted into an electrical pulse having sufficient energy to operate an indexing register. This is accomplished without requiring the movement of any of the electrical contact circuitry leading from the detection means 68 to the register itself. Also, the entire impulse generator is mounted on a bracket forming a capsule which can be simply and effectively inserted or removed from the meter housing should maintenance or replacement be required. The unique combination of parts used provides an accurate, reliable device which is economical to manufacture and requires no auxiliary power source other than that Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims other than by particular details of construction shown, except as specifically stated in the claims.

The embodiments of the invention in which an exclusive property or privilege is claimed are defined as follows.

1. In an improved fluid flow meter device having a measuring means mounted to the casing of said meter, said means including a rotating spindle and spur gear mounted thereon, each revolution of said spur gear being responsive to a defined volume or rate of flow through said meter, registry means mounted remotely from said meter, said registry means providing a visual read out on the volume or rate of flow through said meter, said improvement comprising an impulse generator for converting the movement of said rotating spindle and spur gear into pulses of electrical energy for actuation of said registry means, said impulse generators including a reciprocating gear driven by said rotating spur gear; means biasing said reciprocating gear opposite the direction of drive, said reciprocating gear driven by said rotating gear, during only a portion of each revolution of said rotating gear, said reciprocating gear when released from the influence of said rotating gear being rapidly rotated in a direction opposite said drive direction by said biasing means; magnetic means operatively associated with said reciprocating spur gear for joint rotation therewith so that when said biasing means rapidly rotates said reciprocating gear, said magnetic means creates a moving magnetic field; and detection means being mounted stationary with respect to said reciprocating spur gear and magnetic means for detecting said moving magnetic field and converting said movement into an electrical output signal which is transmitted through electrical circuitry interconnecting said meter and remotely positioned registering means to actuate said registry means.

2. The improvement according to claim 1 wherein said magnetic means is comprised of one or more cylindrically shaped elements operatively associated with said reciprocating gear for joint rotation therewith, and said detection means is comprised of a pole piece positioned within said magnetic means and having a core having a series of wire winding around said core, said windings having a pair of leads adapted to be connected to an electrical circuit, said wire windings detecting said moving magnetic field and converting said movement into an electrical impulse of current through said leads, said detection means being stationary with respect to said reciprocating gear and magnetic means.

3. The improvement according to claim 2 wherein said meter casing includes a housing portion for receiving said generator, said housing portions having an opening to permit insertion thereof, said impulse generator including a mounting bracket for mounting said generator thereto to permit quick and easy insertion and removal of said brackets and generator into and out of said meter case housing.

4. The improvement according to claim 3 wherein said housing portion includes a pair of side-by-side enclosures, one of said enclosures enclosing said measuring mechanism, and the other of said enclosures enclosing said impulse generator to permit visual reading of said measuring mechanism at the meter situs.

5. The improvement according to claim 4 wherein said housing is an integral member comprised of plastic or the like.

6. The improvement according to claim 3 wherein said impulse generator is mounted on said bracket so that when said bracket is inserted in said case housing, said generator is accurately indexed so that said reciprocating spur gear is positioned for engagement by said rotating spur gear.

7. The improvement according to claim 3 wherein said bracket includes an end wall portion which encloses said housing opening when said generator is inserted in said housing, said end wall including fastener means for hermetically sealing said generator within said housing and a pair of terminal posts mounted through said end wall to permit said lead wires to be electrically interconnected to appropriate wiring connected externally to said posts.

8. The improvement according to claim 3 wherein said housing bracket includes a lower horizontal portion for supporting said generator and a vertical end wall portion which closes said generator housing opening when said bracket is inserted into said case housing, said horizontal portion including a recessed portion for receiving the lower projecting portions of said pole piece to properly index said generator, said reciprocating spur gear and magnetic means adapted to telescope around said pole piece, said pole piece having an upper portion projecting above said reciprocating gear and magnetic means, said impulse generator further including a generally disc-shaped cap having a recess portion for receiving the upper projections of said pole piece and a keeper portion projecting upwards from said cover so that when said generator and mounting bracket are inserted in said housing, said keeper portion is adapted to form a friction tight fit with the upper wall of said housing to anchor said generator in its desired position.

9. The improvement according to claim 2 wherein said reciprocating spur gear is comprised of a first peripheral portion having teeth for engagement with said rotating spur gear, a second peripheral portion having an overall radius equal to the radius of said toothed portion, and a third peripheral portion recessed radially with respect to said first and second portions said biasing means comprising a coil spring connected at one end to a post, anchored in said recess portion, the other end of said spring being anchored to a stem mounted on said reciprocating spur gear in close proximity to the termination point between said first and second peripheral portions, the termination between said second and third peripheral portions providing a stop engageable with said post so that when said spur gear is rotated against the bias of said spring and released for rapid rotation in the opposite direction by said spring, said stop limits further rotation of said reciprocating gear when it comes into contact with said post.

10. The improvement according to claim 9 wherein said reciprocating spur gear includes a pair of axially extending generally cylindrically shaped projection members in an opposed and spaced relationship, said magnetic means including a pair of opposite poled magnets positionable between said reciprocating gear projections to form a continuous cylindrical ring.

11. The improvement according to claim 9 wherein said driving engagement between said reciprocating spur gear in said rotating gear is initiated at the termination between said first and third peripheral portions of said reciprocating gear, said tooth portion including a first tooth at said termination point and a gap of at least one tooth between said first and subsequent teeth to eliminate any possible adverse binding between said gear teeth.

12. An improved impulse generator for converting the kinetic energy of a rotating spindle into pulses of electric energy comprising, in combination: a rotating spur gear driven by said spindle a reciprocating spur gear driven by said rotating gear; means biasing said reciprocating gear in a direction opposite the direction of drive; magnetic means operatively associated with said reciprocating spur gear for rotation therewith, said reciprocating gear driven by said rotating gear during only a portion of each revolution of said rotating gear so that when said driving relationship is terminated, said biasing means acts to rapidly rotate said reciprocating gear and magnetic means associated therewith in a direction opposite said drive direction to create a moving magnetic field; and means for detecting said moving magnetic field and converting said movement into an electrical output signal, said detection means being mounted stationary with respect to said reciprocating spur gear and magnetic means.

13. The combination according to claim 12 wherein said magnetic means is cylindrical, and said detection means is comprised of a pole piece mounted within the confines of said magnetic means said pole piece including a winding around its core, said winding comprised of wire providing a pair of electrical leads, said winding comprising an armature for detecting and converting said rotating magnetic field into an impulse of current through said wires.

14. The combination according to claim 12 wherein said magnetic means is comprised of two separate magnets of opposite polarity said magnets being mounted for rotation about the axis of said reciprocating spur gear with said detection means mounted intermediate said two segments.

15. An improved fluid flow meter device for use with a fluid flow measuring means comprising, in combination, a mechanism for indicating the volume or rate of fluid flow means for mounting said mechanism adjacent a fluid flow measuring means; an impulse generator positioned side-by-side of said mechanism, said impulse generator being operatively associated with said mechanism to actuate a register positioned remotely from said meter to record said volume or rate of flow; a meter casing; an upper housing mounted to said casing, said housing having a pair of side-by-side enclosures, one of said enclosures enclosing said impulse generator and having a removable portion to permit insertion and removal of said generator independent of said measuring means, the other of said enclosures enclosing said mechanism, said pair of enclosures including means defining an opening to permit physical communication between said generator and mechanism.

16. The fluid flow meter according to claim 15 wherein said upper housing is an integral member comprised of plastic or the like.

17. The fluid flow meter according to claim 15 wherein said impulse generator is mechanically engaged with said measuring means through said opening when said impulse generator is positioned in said one of said enclosures.

18. The fluid flow meter according to claim 17 wherein said impulse generator includes a rotating drive gear in mesh engagement with a spur gear of said measuring means when said impulse generator is positioned in said one of said enclosures.

19. The fluid flow meter according to claim 15 wherein said impulse generator is mounted on a cartridge-like bracket, said one of said enclosures including means for indexing said impulse generator in said one of said enclosures, said cartridge-like bracket including a plate for covering said opening.

* * * * *

UNITED STATES PATENT OFFICE
CERTIFICATE OF CORRECTION

Patent No. 3,772,917  Dated November 20, 1973

Inventor(s) P. D. Lutz, et al.

It is certified that error appears in the above-identified patent and that said Letters Patent are hereby corrected as shown below:

Column 2, line 1 ; "tranmitted" should be --transmitted--;

line 21; "re-placement" should be --replacement--.

Column 6, line 51; "meauring" should be --measuring--;

line 60; "1G." should be --Fig.--.

Column 7, line 32; after "that" insert --derived from the measuring mechanism itself.--.

Signed and sealed this 16th day of April 1974.

(SEAL)
Attest:

EDWARD M. FLETCHER, JR
Attesting Officer

C. MARSHALL DANN
Commissioner of Patents